United States Patent [19]

Abe

[11] Patent Number: 4,616,614
[45] Date of Patent: Oct. 14, 1986

[54] SYSTEM FOR REGULATING THE IDLE SPEED OF AN INTERNAL COMBUSTION ENGINE

[75] Inventor: Kunihiro Abe, Higashimurayama, Japan

[73] Assignee: Fuji Jukogyo Kabushiki Kaisha, Tokyo, Japan

[21] Appl. No.: 756,571

[22] Filed: Jul. 18, 1985

Related U.S. Application Data

[63] Continuation of Ser. No. 557,085, Dec. 1, 1983, abandoned.

[30] Foreign Application Priority Data

Dec. 3, 1982 [JP] Japan ............... 57-212444

[51] Int. Cl.⁴ .......................................... F02D 11/10
[52] U.S. Cl. ............................................. 123/339
[58] Field of Search ............. 123/339, 440, 489, 352

[56] References Cited

U.S. PATENT DOCUMENTS

| | | | |
|---|---|---|---|
| 3,782,347 | 1/1974 | Schmidt | 123/440 |
| 3,875,907 | 4/1975 | Wessel | 123/440 |
| 3,900,012 | 8/1975 | Wahl | 123/440 |
| 4,425,888 | 1/1984 | Engel | 123/339 |
| 4,428,341 | 1/1984 | Hassler | 123/339 |
| 4,513,711 | 4/1985 | Braun | 123/339 |
| 4,513,712 | 4/1985 | Gassler | 123/339 |

Primary Examiner—Ronald B. Cox
Attorney, Agent, or Firm—Martin A. Farber

[57] ABSTRACT

A system for regulating the idle speed of an internal combustion engine with an electronic fuel injection system having a bypass around a throttle valve of the engine and a solenoid operated control valve provided in the bypass to control the volume of air flow passing the bypass. The system comprises an engine speed sensor for sensing the engine speed of the engine and for producing an engine speed voltage, an idle switch responsive to idle operation of the engine for producing an idle signal, and a reference voltage circuit for producing a reference voltage corresponding to a predetermined idle speed. Integrating circuits for producing regulating signals dependent on the difference between the engine speed voltage and the reference voltage. The regulating signals comprise a first signal the voltage of which rapidly increases and a second signal the voltage of which slowly increases. A change-over switch is provided to be responsive to the idle signal for applying the engine speed voltage to the integrating circuits. The regulating signals are applied to a driver for energizing the solenoid of the solenoid operated control valve to actuate the control valve to regulate the idle speed to the predetermined idle speed.

4 Claims, 4 Drawing Figures

SYSTEM FOR REGULATING THE IDLE SPEED OF AN INTERNAL COMBUSTION ENGINE

BACKGROUND OF THE INVENTION

This application is a continuation of Ser. No. 557,085, filed 12/1/83 and now abandoned.

The present invention relates to a system for regulating the idle speed of an internal combustion engine with an electronic fuel injection system, and more particularly to a system for adjusting the volume of intake air passing through a bypass around a throttle valve so as to keep the idle speed at a predetermined speed.

Generally, the volume of intake air is measured by an air flow meter provided in an intake passage to convert to an electric air flow signal which is fed to an electronic control unit. The electronic control unit is responsive to the air flow signal to control the amount of injected fuel. A conventional idle speed control system is provided with a feedback control circuit responsive to the idle speed for producing a control signal. The control signal is applied to a solenoid for a regulator valve provided in the bypass to regulate the idle speed.

A conventional feedback control circuit includes an idle speed sensor, an integrator for comparing the idle speed sensed by the idle speed sensor with a reference value and for producing an output, and a driver responsive to the output of the integrator to energize the solenoid of the regulator valve so as to regulate the idle speed to a predetermined speed. In such a feedback control circuit, the circuit constant determined by the RC constant must be selected to prevent hunting of the idle speed. However, if the constant is selected to prevent hunting, the response of the system to a large slowdown by a heavy electric load such as head lights, air conditioner and others and the convergence of the deviation of the idle speed relative a predetermined idle speed deteriorate.

SUMMARY OF THE INVENTION

The object of the present invention is to provide a system for regulating idle speed which has high response and convergence characteristics.

According to the present invention, there is provided a system for regulating the idle speed of an internal combustion engine with an electronic fuel injection system having a bypass around a throttle valve of the engine and a solenoid operated control valve provided in the bypass to control the volume of air flow passing the bypass, comprising: first means for sensing the engine speed of said engine and for producing an engine speed signal; an idle switch responsive to the idle operation of said engine for producing an idle signal; second means for producing a reference voltage corresponding to a predetermined idle speed; third means for producing a regulating signal dependent on the difference between said engine speed voltage and said reference voltage, the regulating signal comprising a first element the amount of which rapidly increases and a second element the amount of which slowly increases; switch means responsive to said idle signal for applying said engine speed signal to third means; and a driver responsive to said regulating signal for energizing a solenoid of said solenoid operated control valve to actuate said control valve to regulate the idle speed to the predetermined idle speed.

The other objects and features of this invention will be apparently understood from the following description with reference to the accompanying drawings.

DETAILED DESCRIPTION OF THE PREFERRED EMBODIMENT

Figure 1:
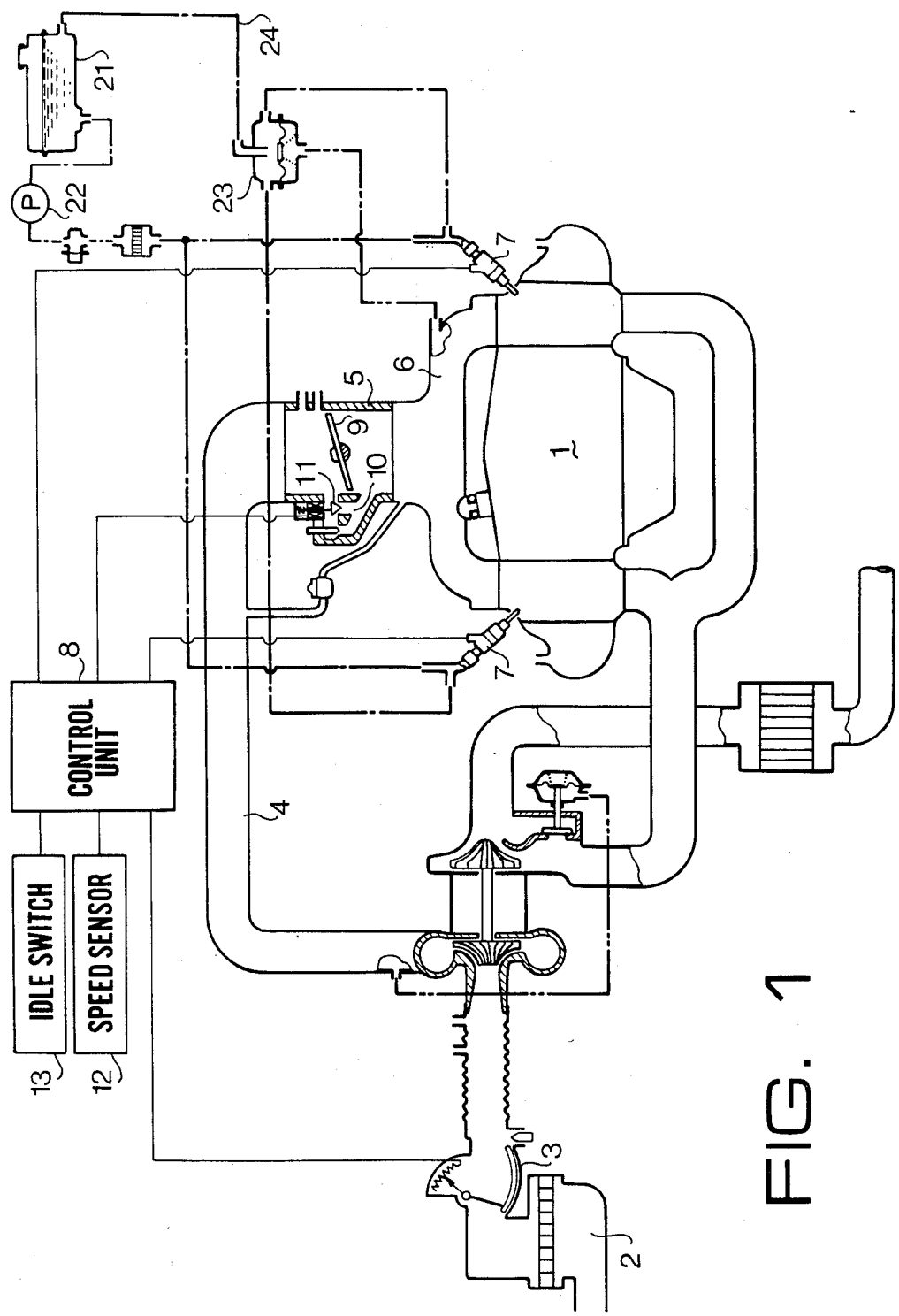
FIG. 1 is a schematic view showing an embodiment of the present invention.

Referring to FIG. 1, an engine 1 is an opposed-four-cylinder type engine and provided with an intake pipe 4 and air flow meter 3 downstream of an air cleaner. A throttle body 5 communicates with the intake pipe 4 and an intake manifold 6. Four fuel injection valves 7 are provided respectively on each branch of intake manifolds for each cylinder. Each fuel injection valve 7 supplies fuel to the corresponding cylinder from a fuel tank 21 by a fuel pump 22 and surplus fuel returns to the fuel tank 21 through a pressure regulator 23 and conduit 24. Opening and closing of the fuel injection valve 7 is controlled by a control signal from an electronic control unit 8. The control unit 8 is applied with signals from the air flow meter 3, a coolant temperature sensor (not shown) and others in order to control the fuel injection.

A bypass 10 is provided around a throttle valve 9 in the throttle body 5. A control valve 11 is provided in the bypass 10 to control the volume of air flow passing through there. The electronic control unit 8 is applied with an idle signal from an idle switch 13 during idling and with an engine speed signal from an engine speed sensor 12 so as to operate the control valve 11.

Figure 2:
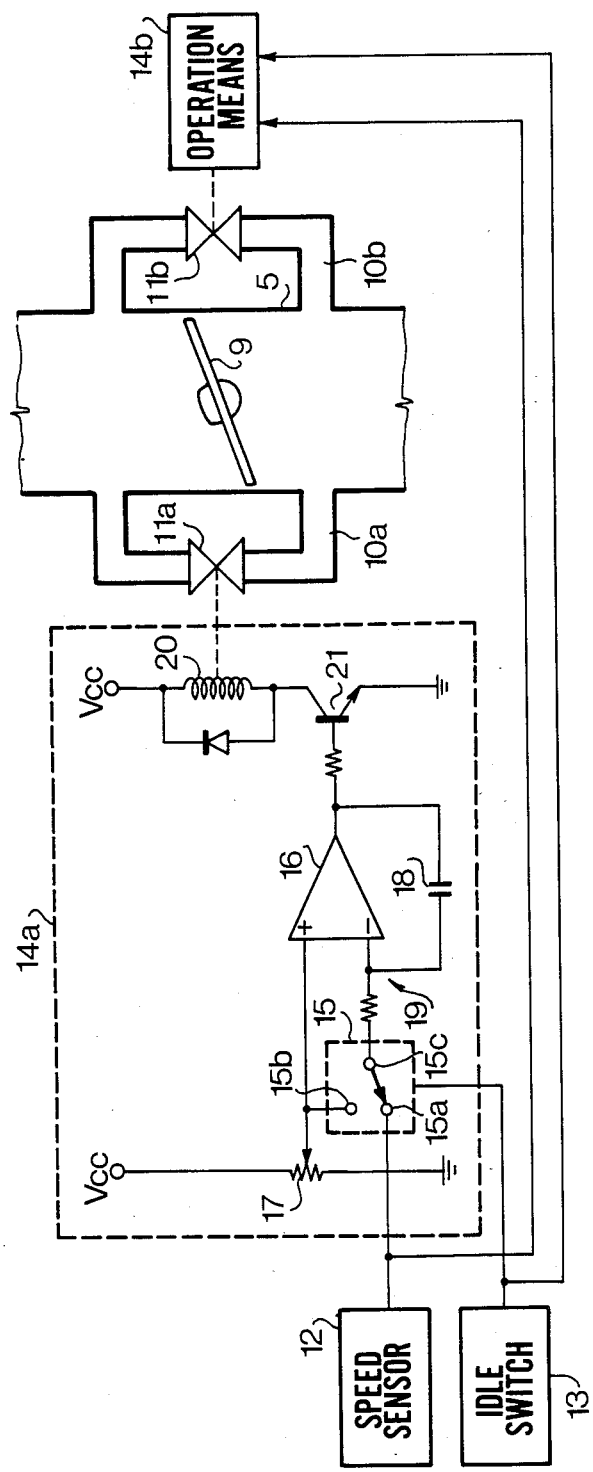
FIG. 2 is an idle speed regulating system according to the present invention.

Referring to FIG. 2 showing an embodiment of the present invention, a pair of bypasses 10a and 10b and control valves 11a and 11b are provided. In order to actuate both control valves 11a and 11b, a first operation means 14a and a second operation means 14b are respectively provided. The engine speed sensor 12 is responsive to ignition pulses to produce the engine speed signal, and the idle switch 13 is operated by an accelerator pedal (not shown) of a vehicle to produce an idle signal at the idling position of the accelerator pedal, where the throttle valve 9 is closed. The output of the idle switch 13 is connected to a control gate of a change-over switch 15 of the first operation means 14a to change connections between contacts 15a and 15b. The output of the engine speed sensor 12 is connected to the contact 15a. A movable contact 15c of the change-over switch 15 is connected to an inverting input of an integrator 16 with a capacitor 18. In order to give a reference idle speed voltage, a variable resistor 17 is provided, a slider of which is electrically connected to the contact 15b and to the non-inverting input of the integrator 16. The output of the integrator 16 is connected to a base of a transistor 21 as a driver. The transistor 21 is provided in a circuit of a solenoid 20 for actuating the control valve 11a.

The second operation means 14b is the same as the first operation means 14a in construction. However, the RC value of the first operation means is selected with a value smaller than that of the second operation means, in order to provide a rapid response characteristic together with the effect on the prevention of hunting of idle speed.

In operation, in idling conditions, the output of the idle switch 13 causes the movable contact 15c to connect with the contact 15a, so that the output of the engine speed sensor 12 is applied to the integrator 16 and the output is also applied to the integrator of the second operation means 14b. When the engine idle speed is equal to a predetermined idle speed, the voltage at the inverting input of each integrator is equal to that of the non-inverting input. Accordingly, the output of each integrator is zero and the transistors 21 are off, so that the control valves 11a and 11b are closed.

When the idle speed decreases because of an increase of electric load such as head lights, the voltage at the inverting input of each integrator 16 drops. Accordingly, the output voltage of each integrator rises to render the transistors 21 conductive. Thus, each solenoid 20 is energized to open the control valves 11a and 11b so as to increase the volume of air flow passing through the bypasses 10a and 10b. As a result, the output of the air flow meter 3 increases, so that the control signal of the electric control unit 8 varies to increase the amount of fuel injected from the injection valves 7. Thus, the engine idle speed is increased. When the idle speed rises to the predetermined engine speed, the transistors 21 are turned off to close the control valves 11a and 11b.

Since the value of RC of the first operation means is small, the input is rapidly integrated, so that the control valve 11a is quickly opened. Accordingly, the system immediately responds to a large deviation of the idle speed to converge the deviation. On the other hand, since the control valve 11b slowly opens, hunting of idle speed can be prevented.

When the accelerator pedal is depressed, the output of the idle switch 13 changes to a low level thereby to change the contact of the movable contact 15c to the contact 15b. Thus, the output of each integrator 16 has a low level, so that the transistors 21 become non-conductive to close the control valves 11a and 11b.

Figure 3:
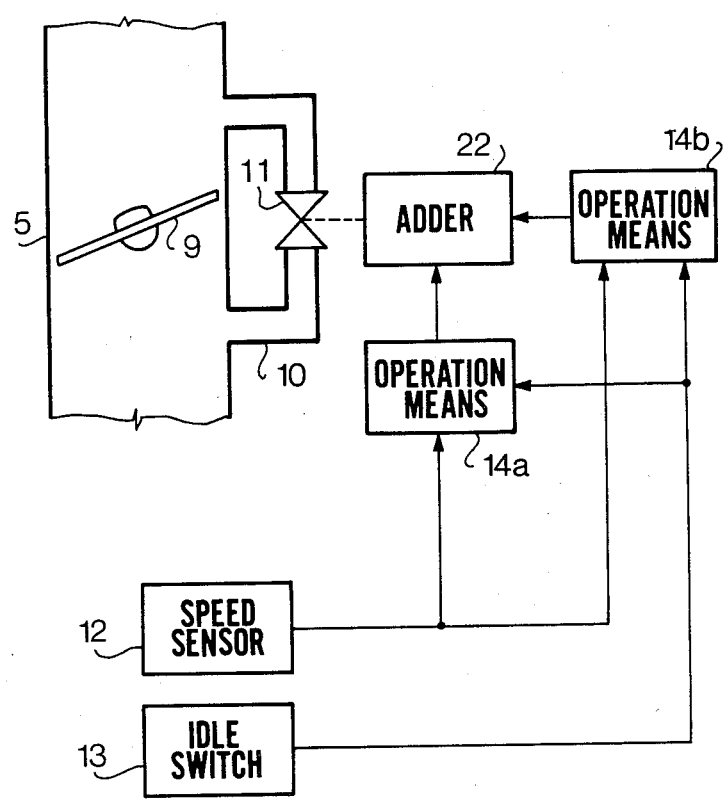
FIGS. 3 and 4 show other embodiments of the present invention, respectively.

Referring to FIG. 3 showing a second embodiment of the present invention, the system is provided with a single control valve 11 in a single bypass 10 and an adder 22. Outputs of the previously described first operation means 14a and the second operation means 14b have however are added by the adder and the control valve 11 is actuated by the output of the adder 22. The regulating effect on the idle speed is the same as the first embodiment.

Figure 4:
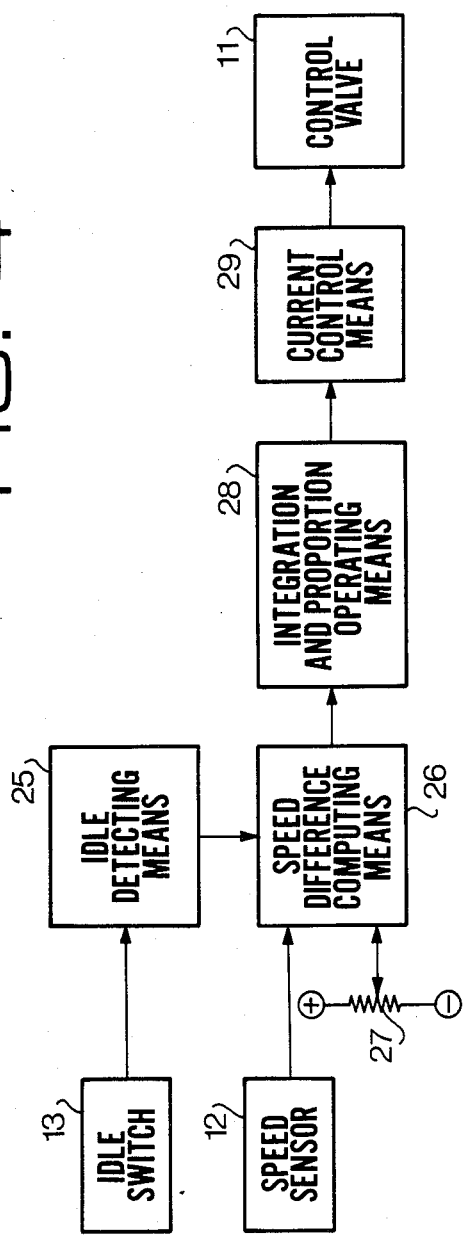

Referring to FIG. 4 showing a third embodiment of the present invention, the system is constructed by a microcomputor. The output of the idle switch 13 is applied to an idle detecting means 25 which produces an idle signal. The output of the engine speed sensor 12 is fed to a speed difference computing means 26. The speed difference computing means 26 operates in accordance with the idle signal from the means 25 and computes the difference between the output of the engine speed sensor 12 and a reference voltage applied from a reference voltage circuit 27. The difference signal from the difference computing means 26 is fed to an integration and proportion operating means 28. The operating means 28 produces a regulating signal which comprises a first component the amount of which rapaidly increases by the proportion operation and a second component the amount of which slowly increases by the integration operation, such as the output of the adder 22 of the second embodiment. The output signal is applied to a current control means 29 which produces a current control output. The current control output is applied to the control valve 11 for the actuation thereof. This system has also an idle speed regulating operation similar to above described embodiments.

From the foregoing it will be understood that the present invention provides a system for regulating the idle speed which has high response and convergence characteristics.

While the presently referred embodiment of the present invention has been shown and described, it is to be understood that this disclosure is for the purpose of illustration and that various charges and modifications may be made without departing from the spirit and scope of the invention as set forth in the appended claims.

What is claimed is:

1. In a system for regulating the idle speed of an internal combustion engine with an electronic fuel injection system having an air flow bypass around a throttle valve of the engine and at least one solenoid operated control valve having at least one solenoid provided in the bypass to control the volume of air flow passing through the bypass, the improvement comprising:
    first means for sensing speed of said engine and for producing an engine speed signal;
    at least one second means for producing a reference voltage corresponding to a predetermined idle speed;
    integration operating means operatively for producing during idle operation of said engine a regulating signal dependent on the difference between said engine speed signal and said reference voltage, the regulating signal comprising simultaneously a first integration component, the value of the latter relatively rapidly increasing, and a second integration component, the value of the latter relatively slowly increasing; and
    a driver responsive to said regulating signal for energizing at least one said solenoid of at least one said solenoid operated control valve to actuate at least one said control valve in a manner dependent on said first and second integration components to regulate the idle speed to the predetermined idle speed so as to converge thereto with minimized hunting.

2. The system according to claim 1, further comprising
    an idle switch responsive to the idle operation of said engine for producing an idle signal,
    switch means responsive to said idle signal for applying said engine speed signal to said integration operating means.

3. The system according to claim 1, further comprising
    an idle switch responsive to the idle operation of said engine for producing an idle signal,
    switch means responsive to said idle signal for actuating said integration operating means.

4. The system according to claim 1, wherein
    said regulating signal is a combined regulating signal combining simultaneously said first and second integration components.

* * * * *